(12) United States Patent
Rakhman et al.

(10) Patent No.: US 7,589,154 B2
(45) Date of Patent: Sep. 15, 2009

(54) PROCESS FOR MAKING THERMOPLASTIC VULCANIZATES

(75) Inventors: Moshe Rakhman, Nesher (IL); Tehila Feiglin, Haifa (IL); Michael Gishboliner, Karmiel (IL); Michael Shuster, Nesher (IL)

(73) Assignee: Carmel Olefins Ltd, Haifa (IL)

( * ) Notice: Subject to any disclaimer, the term of this patent is extended or adjusted under 35 U.S.C. 154(b) by 477 days.

(21) Appl. No.: 10/561,825

(22) PCT Filed: Jul. 8, 2004

(86) PCT No.: PCT/IL2004/000615

§ 371 (c)(1),
(2), (4) Date: Dec. 22, 2005

(87) PCT Pub. No.: WO2005/005532

PCT Pub. Date: Jan. 20, 2005

(65) Prior Publication Data

US 2006/0155072 A1    Jul. 13, 2006

(30) Foreign Application Priority Data

Jul. 10, 2003   (IL) ..................... 156870

(51) Int. Cl.
*C08L 23/00*   (2006.01)
*C08F 255/00*  (2006.01)
*C08F 291/00*  (2006.01)

(52) U.S. Cl. ................ 525/195; 525/191; 525/193; 525/197; 525/240

(58) Field of Classification Search ........... 525/242, 525/263, 262, 71, 72, 478, 70, 191, 192, 525/209, 231, 240, 247, 326.1, 474, 477, 525/479
See application file for complete search history.

(56) References Cited

U.S. PATENT DOCUMENTS

| | | | |
|---|---|---|---|
| 4,130,534 A | | 12/1978 | Coran et al. |
| 4,183,876 A | | 1/1980 | Coran et al. |
| 4,558,094 A | * | 12/1985 | Deguchi et al. ............... 525/71 |
| 4,614,764 A | | 9/1986 | Colombo et al. |
| 4,803,244 A | | 2/1989 | Umpleby |
| 4,873,042 A | * | 10/1989 | Topcik .................. 264/211.24 |
| 5,066,700 A | | 11/1991 | Braga et al. |
| 5,240,983 A | | 8/1993 | Tabata et al. |
| 5,623,030 A | * | 4/1997 | Tsumura et al. ............. 525/478 |
| 5,840,800 A | * | 11/1998 | Joffre et al. ................. 524/806 |
| 6,147,160 A | | 11/2000 | Wang et al. |
| 6,331,595 B1 | | 12/2001 | Mitchell et al. |
| 6,448,343 B1 | | 9/2002 | Schombourg et al. |
| 6,476,132 B1 | | 11/2002 | Abdou-Sabet et al. |
| 2002/0151647 A1 | | 10/2002 | Laughner et al. |
| 2003/0114604 A1 | | 6/2003 | Schlosser et al. |

FOREIGN PATENT DOCUMENTS

| | | |
|---|---|---|
| DE | 44 02 943 | 8/1995 |
| EP | 0 409 542 | 1/1991 |
| EP | 1050548 A1 * | 11/2000 |
| EP | 1 072 644 | 1/2001 |
| WO | WO 98/23687 | 6/1998 |
| WO | WO 00/68278 | 11/2000 |

OTHER PUBLICATIONS

Wenig et al. "Phase separation in incompatible polymer blends: polypropylene-polyethylene system." Progr Colloud & Polymer Sci. vol. 71 (1985) 113-118.*
International Search Report for corresponding PCT application—3 pages.
International Preliminary Report on Patentability for corresponding PCT application—5 pages.

* cited by examiner

*Primary Examiner*—Irina S Zemel
*Assistant Examiner*—Jeffrey Lenihan
(74) *Attorney, Agent, or Firm*—Roach Brown McCarthy & Gruber, P.C.; Kevin D. McCarthy

(57) ABSTRACT

The invention provides a process for dynamic vulcanization comprising grafting organic silane on disperse phase component, thereby introducing chains into the component which are cross-linkable in the presence of cross-linking agents when the component is molten. The invention further provides thermoplastic vulcanizates having superior properties, including high flexibility and impact resistance, low hygroscopicity, non-toxicity, and excellent processability.

24 Claims, No Drawings

PROCESS FOR MAKING THERMOPLASTIC VULCANIZATES

FIELD OF THE INVENTION

This invention relates to a process for making thermoplastic vulcanizates (hereinafter, briefly, TPVs) and to the products obtained from said process. The term "vulcanization" was traditionally used to designate the cross-linking of natural rubber by sulfur bridges, but has become more generally used, and so is used herein, to designate a process that leads to the cross-linking of elastomers.

BACKGROUND OF THE INVENTION

Thermoplastic vulcanizates (TPVs) are a class of polymer materials comprising a continuous phase (matrix) usually of partially crystalline thermoplastic polymer (such as polypropylene and propylene copolymers) and a cross-linked ("vulcanized") disperse phase, usually elastomeric. TPVs were developed to close the gap between thermoplastic elastomers and thermoset rubbers. Having rubber-like properties (soft touch, resilience) and being processable by methods used for thermoplastic, these materials have better cost-performance ratios than traditional thermoset rubbers in certain applications.

A process specially designed to produce TPVs is dynamic vulcanization (hereinafter, briefly, DV). DV is based on cross-linking of disperse phase material during intensive shear mixing, thus preventing it to form a continuous phase. This process also generally includes phase inversion. Being usually a majority in the initial blend, the vulcanizable material forms a continuous phase, while the second component forms a disperse phase. However, the vulcanizing process leads to an increase in the viscosity of the vulcanized polymer, while the viscosity of non-cross-linked components remains unchanged or even slightly decreases. When the viscosity of the cross-linked phase becomes significantly higher than that of the said second component, the vulcanized phase begins to break into droplets, that decrease in size as the viscosity increases. At this stage, phase inversion occurs, i.e., the non-cross-linked component changes from a disperse phase to a continuous matrix, while the vulcanized component changing from a matrix to a disperse phase. The phase inversion allows to obtain TPVs with well-defined phase structure, even at very high cross-linked phase contents (70% and higher).

DV processes may be implemented as batch (using batch mixers such as Banbury) or as continuous (using compounding equipment, e.g., twin-screw extruders). The continuous process has obvious advantages (higher output, better product uniformity, lower labor costs), but the residence time in the processing equipment is significantly shorter, requiring highly efficient cross-linking system to complete the reaction inside said equipment and to prevent post-curing during the following shaping and use of the resulting products.

It should be noted that it is not required that a matrix polymer (by which expression is meant the non-cross linked component that constitutes the matrix after phase inversion has occurred) of a TPVs be absolutely insensitive to the condition in which the elastomeric phase is vulcanized to form TPVs. Some reaction between the matrix and the vulcanization agents may occur, and may even be a significant reaction (see, e.g., U.S. Pat. No. 4,183,876).

U.S. Pat. No. 4,130,534 describes TPVs compositions, called, however, "elastomeric compositions", comprising crystalline polyolefins and butyl or halobutyl rubber, made by DV, e.g., in extruder, or not. Curing agents are listed at col. 7, lines 20-42.

U.S. Pat. No. 4,183,876 is more general than the two previous patents. It uses DV, though not necessarily, and mentions many possible alternatives, but the claims are limited to polyalkenamer rubber, defined as "random noncrystalline, rubbery polymer of cycloalkene". Dynamic vulcanization is described as "masticating" the blend of components, e.g. in extruders, "at a temperature sufficient to effect cross-linking formation".

U.S. Pat. No. 5,066,700 discloses a process comprising making a mixture of 1) PP or PET-PP; 2) ethylene-propylene elastomeric copolymer or diene elastomeric terpolymer; 3) peroxide; 4) furan derivative; masticating while heating, and adding oil.

U.S. Pat. No. 4,803,244 discloses cross-linking the rubber component by hydrosilylation, viz. adding a silicon hydride across a multiple bond, often with a transition catalyst. An example is rhodium-catalyzed hydrosilylation of EPDM rubber in blend with PP.

U.S. Pat. No. 6,147,160 improves on U.S. Pat. No. 4,803,244 by a) suggesting specific copolymers of, e.g., isobutylene and divinylbenzene; b) hydrosilylating them with Pt catalyst.

U.S. Pat. No. 6,331,595 discloses grafting a monomer which may be a vinyl trialkoxy silane, onto a polyolefin, using as a catalyst an organic peroxide coated onto a carrier polymer.

U.S. Pat. No. 6,448,343 discloses using amino silane in the preparation of TPV by DV whereas the disperse phase component is grafted by acid or anhydride moiety prior to the reaction with said amino silane. Among the drawbacks are a long residence time, and a low gel content.

US20030114604 relates to use of acid moieties to catalyze moisture cross-linking of silane grafted polymers, but does not relate to DV. The cross-linking stage in this case is rather slow and should take place outside the processing machine.

WO 00/68278 discloses a process for making TPVs, using ultra low density polyethylene (ULDPE) as disperse phase polymer, and crystalline thermoplastic polyolefin as matrix, while ULDPE is grafted with organo silane and then dynamically cross-linked by basic aqueous buffer solution in the presence of said matrix polymer. However, since the moisture cross-linking is rather slow, a combination of two extruders is needed, along with huge injections of aqueous solutions for achieving a reasonable gel content and cross-link density.

While the literature on TPVs is very extensive, no fully satisfactory process is available in the art. DV is preferable to other systems, but there are difficulties in carrying out full vulcanization of the elastomers used. Prior art DV processes involve significant disadvantages. In some cases phenolic resins are used in this reaction, and they are toxic. In other processes, tin dichloride is used and results in hygroscopicity of the TPVs. Some processes lead to discoloration or staining of the finished product and it is very difficult to obtain a product having a natural white color. In other processes, the elastomers have poor UV resistance. Finally, prior art processes do not permit the use of a wide range of matrices and cross-linkable components.

It is therefore the purpose of this invention to provide a process that is free from all the aforesaid disadvantages and that permits the use of a wide range of polymers.

It is another purpose to provide a process that is easily carried out and uses standard equipment, such as extruders, and that can be implemented continuously.

It is a further purpose to provide a process which causes substantially full cross-linking of the elastomer within a short residence time and which permits to use low contents of cross-linking agents.

It is a still further purpose to provide a final TPV product that has a combination of physical properties that will be set forth hereinafter.

Other purposes and advantages of the invention will appear as the description proceeds.

SUMMARY OF THE INVENTION

The process of the invention comprises dynamic vulcanization (DV) of the disperse phase polymer (which may be elastomer) that will be a component or components of the final TPVs, in presence of the matrix polymer that will be another component of said TPV's, which DV comprises the steps of grafting an organic silane, particularly an alkoxy silane, on the disperse phase polymer, whereby to form grafted polymeric chains, and then completing the vulcanization by cross-linking the grafted polymer chains. Both the grafting and cross-linking are carried out in the melt state at elevated temperature, either in batch or continuous mode, the latter being preferred. Said cross-linking does not require the presence of water or water vapor. Preferably, in the batch mode the two reactions are performed successively in the same apparatus (for instance, a batch melt mixer), while in the continuous mode, the reactions are carried out preferably in an extruder (such as a twin screw, co-rotating, fully intermeshing extruder), but preferably are performed simultaneously in different zones of the extruder barrel, providing fully cross-linked disperse phase polymer. While reference will be made hereinafter to a disperse phase and a matrix material, this is done only for brevity's sake and should not be taken as a limitation, since more than one elastomer and more than one matrix material could be present in the TPVs of the invention. Also, the terms "matrix" and "disperse phase" should be understood as referring to the structure of the TPVs after phase inversion has occurred, since at the beginning of the process leading to the TPVs, and before the phase inversion, the phase structure of the blend may be quite different, so the component to be cross-linked may constitute a continuous phase in the initial blend, and the crystalline component may be dispersed therein. Hereinafter, the terms "disperse phase material" and a "matrix material" will designate, unless otherwise specified, the components that will constitute the disperse phase and the matrix, respectively, no matter whether the phase inversion, and the cross-linking of the cross-linkable component, have already occurred or not, in spite of the fact that before the phase inversion the "disperse phase material" may constitute the matrix and the "matrix material" may constitute disperse phase.

The disperse phase material may be a non-elastomer, or polymers which may be considered as not really being elastomers, such as medium or high density polyethylene. In many preferred cases, however, it is an elastomer. Likewise, the matrix material may be partially crystalline or amorphous.

Further, the meaning to be given in this application to the terms "vulcanization", "grafting" and "cross-linking" must be clearly defined, since the same terms may be used differently in other technical documents. "Grafting" is used herein in its normal meaning: the addition to a base molecule (which often is a polymeric, molecular chain) of separate, generally smaller moieties, either as lateral appendages to said molecule, or as insertion into said molecules, said moieties essentially maintaining their basic structure. In the present case, the original, non-vulcanized chains are the base molecules and the silane moieties are laterally attached to them or inserted into them by said grafting. "Cross-linking" is the following step: the silane-grafted, polymer chains are connected to one another through the silane moieties, by the action of a cross-linking agent, whereby to form a reticular structure. "Vulcanization" means herein the succession of grafting and cross-linking. The non-vulcanized polymers might also be called "polymer precursors", since they are the starting material from which vulcanized polymers are produced, but such a term will generally be avoided as it may be confusing.

The matrix materials (or briefly, "matrix") and the non-vulcanized, disperse phase components are chosen as follows. The matrix material may be semi-crystalline or amorphous polymer, preferably—partially crystalline polymer, more preferably—partially crystalline polyolefin or polyamide, examples of which will be given hereinafter. The matrix material may be from 15 to 80 wt % of the total polymeric mixture, viz. of the sum of the matrix material and the disperse phase component or components. Preferably, however, it is from 30 to 70 wt %. Higher matrix contents cause loss of advantages of the TPV, such as resilience and rubber-like behavior.

The disperse phase component can also be chosen from a large number of polymers, examples of which will be given hereinafter. Its content should be from 20 to 85 wt % of the whole polymeric mixture, but is preferably from 30 to 70 wt %.

The grafting of silane onto disperse phase component is carried out by means of silanes, particularly alkoxy substituted vinyl silanes, allyl silanes, methacryl silanes or blends thereof. The content of organic silane in the initial composition of raw materials is preferably 0.5 to 5.0 parts, more preferably 0.8 to 2.0 parts per 100 parts of total polymeric material.

The cross-linking of the grafted elastomer requires the presence of a cross-linking agent. The cross-linking agent of this invention may be normally solid or liquid, preferably normally solid. According to the invention, said agent is a functional compound, preferably polyfunctional compound having acid functionality, optionally in combination with an amine compound. Said acid compound is chosen from the group consisting of inorganic, organic sulfonic or carboxylic acids, preferably polyfunctional, or their anhydrides. Examples of such acids are adipic, oxalic, maleic, phthalic, isophthalic, citric, pyromellitic acids, benzene sulfonic acid derivatives, phthalic, maleic or boric anhydrides. Boric acid is the most preferred. Examples of said amine compounds are triisopropanol amine or triethanol amine. The amount of cross-linking agent is preferably from 0.05 to 5, and more preferably from 0.1 to 0.5, parts per 100 parts of total polymeric content of the mixture.

Additional components may be added, as will be better explained hereinafter, and they may comprise antioxidants, plasticizers, mineral fillers and functional components.

In the process of the invention, the grafting and cross-linking of the disperse phase polymer are performed in the melt state at high temperatures, in batch or in continuous mode. If carried out in batch mode, the two stages of grafting and cross-linking are carried out successively; if carried out in continuous mode, the two stages are carried out in different zones of the barrel of an extruder, or at similar conditions if a different apparatus is used.

In order to assure high selectivity of the grafting reaction, the matrix polymer should be chosen to be not cross-linkable or a disperse phase component should be chosen, the melting point of which is lower than that of the matrix polymer. In this latter case, the grafting temperature should be higher than the melting point of the disperse phase component but not higher, and preferably lower, than the melting point of the matrix component to strongly reduce possibility of silane grafting on matrix component.

The cross-linking stage starts when the cross-linking agent is added to the reaction mixture. At this stage the reaction temperature should be raised to a level at which all polymer components are melted.

Preferably, any remains of volatile components in the product should be removed by venting or vacuum, preferably after the grafting stage has ended. Extender oil may be added to the mixture at any stage, preferably after the grafting stage, more preferably after removal of the volatile components. Mineral fillers may be added, and antioxidants may be added after the grafting step. Also additional polymer components such as semicrystalline or amorphous polymers, elastomers, and grafted copolymers may be added at any stage.

The invention further comprises a final TPV having a set of physical properties that will be specified hereinafter.

DETAILED DESCRIPTION OF PREFERRED EMBODIMENTS

To provide rubber-like performance, the matrix and disperse phase polymers should preferably be thermodynamically incompatible and the final TPV product should preferably have the following properties:

low rigidity, high flexibility measured by low Shore hardness (usually TPVs have Shore hardness between 25 A and 60 D);

high disperse phase content (50% and more by volume);

high gel content of the vulcanized disperse phase component (the gel is the fraction insoluble in solvents, e.g., boiling xylene); if the gel content is more than 95%, the material is defined as "fully cross-linked";

otherwise, it is defined as "partially cross-linked";

high cross-link density of said vulcanized disperse phase component measured as knots concentration per $cm^3$ or molecular weight between knots (Mc);

cross-link density of the dispersed phase of more than $5*10^{-5}$ mol/$cm^3$, preferably more than $10*10^{-5}$ mol/$cm^3$;

a disperse phase consisting, after phase inversion, of fine and uniform particle size (of few microns to submicron), preferably between 0.2 and 2 microns;

white color, lack of hygroscopicity and of toxic components; and there should be narrow gaps (ligaments) between cross-linked disperse phase particles, providing near-continuity of said particles within the matrix.

As matrix materials, various semi-crystalline and amorphous thermoplastic polymers are suitable. Examples are: thermoplastic polyesters, polyacetals, polyvynilidene fluoride (PVDF), polycarbonate, styrenic polymers, crystalline polyethylene, ethylene copolymers, etc.; but polypropylene homopolymer, propylene-ethylene random copolymer (up to 4% ethylene), heterophasic propylene-ethylene (up to 25% of EPR), polyamides are preferred.

The content of matrix material should be 15 to 80 wt %, but preferably 30 to 70 wt % of the total polymeric composition (matrix plus cross-linkable components). If the matrix content is below said ranges, it is difficult to prevent the cross-linked phase from remaining continuous. If the matrix content is above said ranges, the advantages of TPVS, such as resilience and rubber-like behavior, are lost.

The disperse phase polymer, to be vulcanized, is preferably chosen from: Polyethylene having density in the range 0.90-0.96 g/$cm^3$; ethylene-alpha olefin copolymers having density in the range 0.85-0.95 g/$cm^3$; ethylene copolymers with vinyl acetate or acrylate or other polar monomers; chlorinated polyethylene, styrene block copolymers, natural rubber, polybutadiene, butadiene-styrene rubber, nitrile rubber, butyl rubber, chloroprene rubbers, hydrogenated rubbers, and blends thereof.

In the initial polymeric mixture the content of the disperse phase component should be 20 to 85 wt %, but preferably 30 to 70 wt % of the total polymeric mixture (matrix plus cross-linkable elastomers).

As has been said, the process of the invention may be carried out in batch mode, as follows. All the initial polymeric components (matrix and disperse phase component) are mixed with the chosen silane, free radicals generator and, optionally, tin-organic catalyst. The matrix may be fed in this stage only in part and the required amount be completed later. The ratio of the first to the second amount may vary e.g. from 1:10 to 10:1, but it is preferable that the amount fed in the first stage be at least 40 wt % of the total. The mixing of all the aforesaid components may be carried out in any convenient device, e.g. in a batch melt mixer equipped by roller or another mixing elements and heated to a suitable temperature. Most suitable temperatures are those at which the disperse phase component is molten, but the matrix is not molten or at least not totally. This means, temperatures between the melting point of the disperse phase component and that of the matrix. The grafting reaction begins with the mixing and lasts from half a minute to ten minutes. A free radical generator, e.g. an organic peroxide, should be present in the grafting stage, preferably in an amount of 0.05 to 0.2 parts per 100 parts of total polymers. After the end of the grafting, the temperature of the mixture is raised to at least the melting point of the matrix, and the cross-linking agent and an antioxidant of any class known in the art (e.g. hindered phenols, organic phosphites, thioethers or blends thereof) are added. An antioxidant is preferably, though not necessarily, added to the reagents after the grafting step. Its purpose is to protect the final product from thermo-oxidative degradation, and it will also help to neutralize any excess peroxide. If only a part of the matrix was initially fed, the required completion amount is fed at this stage. Cross-linking agent is added at this stage. The antioxidant neutralizes the peroxide, thus completing the grafting reaction, and the cross-linking agent provide cross-linking of the elastomeric phase, while phase inversion occurs. The cross-linking step is accompanied by a significant rise in torque; then the torque stabilizes and may even slightly decrease, signaling that the reaction is finished. The duration of the cross-linking stage may vary from a minute to half an hour. Then the reaction mixture can be devolatilized by air venting. Subsequently, extenders, fillers and other additives, if required, are added and thoroughly mixed, with the said reaction mixture. The final product is discharged from the mixer, processed in any desired way (e.g., on roll mill), cooled and pelletized.

The process of the invention can be carried out in continuous mode, as follows. All the initial polymeric components (matrix and disperse phase component) are fed to the chosen heating and mixing device, preferably are fed gravimetrically into the main hopper of a twin-screw co-rotating fully intermeshing extruder. While an extruder will be referred to hereinafter, this should not be considered a limitation, as other continuous heating-mixing devices could be used. The matrix may be fed in this stage only in part and the required amount be completed later, as hereinbefore set forth. Silane and peroxide, optional tin-organic catalyst may be fed in dry blend with polymers (pre-mixed) or pumped directly into the grafting zone of the extruder, or other equipment, via a metering pump. Gravimetric feeding, however, is preferred. The cross-linking agent is added after the grafting step has been completed. The feeding zone of the extruder is cooled (preventing bridging). The following zone of the extruder is the grafting zone, which is heated to a such a temperature as to melt the disperse phase without melting the matrix. The said grafting zone is equipped with parts, such as kneading segments, to thoroughly mix the blend. The temperature of the grafting zone may increase significantly due to reaction heat, and if so it may be cooled. After the grafting zone, an additional feeder zone is provided, into which are fed the additives needed for causing cross-linking, including cross-linking agents and antioxidants. Said additives, optionally blended with the part of matrix polymer, are fed to said zone, preferably, gravimetrically via additional feeder. The overall amount of matrix can be split between first and second feeding ports in any ratio between 1:10 and 10:1. Preferable 10-20 wt % of the total matrix polymer is fed via said second feeding ports. After the said additional feeding zone the extruder comprises a mixing (cross-linking) zone equipped with kneading blocks and heated to a significantly higher temperature, preferably a temperature that is higher by at least 10° C. than the melting point of the matrix component. The following extruder zone is a devolatilization zone designated for volatiles removal. It should have enough free volume to prevent material entrance to the venting ports. Either atmosphere or vacuum vent can be applied. Extender oil can be pumped into the extruder, in a zone also having free volume for oil introduction, the oil injection zone being isolated from the venting zone to prevent oil venting. After the oil addition, the extruder should include a significant mixing zone. Then additional oil may be injected, if the barrel length allows this. Alternatively, the latter operations can be performed in another extruder or via a separate run. The filler, which may be any filler used in the present TPV art, e.g. calcium carbonate, talc or clay, can be added either via dry blend or via side feeder. The final product is continuously extruded through a die plate, cooled and pelletized either by strand or by the die-face pelletizing method. The overall time of the process may be from 1 to 5 minutes.

The following examples illustrate but do not limit the invention.

EXAMPLES

Example 1

Basic

The first mixture of 50 parts by weight of EPDM (Nordel IP 4760P ex. Du Pont-Dow Elastomers), 35 parts by weight of random propylene-ethylene copolymer (MFI 0.3 g/10 min at 230° C. and 2.16 kg; 3.5% ethylene, ex. Carmel Olefins Ltd.), 1.2 parts by weight of vinyl trimethoxy silane (Dynasylan VTMO ex. Degussa), 0.1 part by weight of 2,5-dimethyl-2,5-di-(tert-butylperoxy)hexane (Luperox 101 ex. Atofina Chemicals) and 0.03 parts by weight of dibutyltin dilaurate (DBTDL), prepared by dry mixing, was fed to the main feeding port of fully intermeshing co-rotating twin-screw extruder (Berstorff ZE25*32). Feeding rate 6.0 kg/h, screws speed 350 rpm.

The second mixture containing 15 parts by weight of random propylene-ethylene copolymer, 0.5 parts by weight of boric acid, 0.4 parts by weight of Irganox B225 antioxidant (ex. Ciba Specialty Chemicals), 0.1 part by weight of calcium stearate was fed through the side feeder located at zone 4 of said extruder with the feeding rate 1.1 kg/h.

Volatile products were removed via vacuum port located at zone 6 of the extruder, equipped with vacuum pump.

Mineral oil (Primol 262) was fed under pressure via injection port located at zone 7 of the extruder by means of a metering pump with the rate providing an output of 149 g/min, i.e., 35 parts by weight of the oil per 100 parts of total polymers.

The resulting molten and homogenized mixture was extruded via three-hole die producing strands that were cooled in the cooling bath, dried online by vacuum drier and cut on the pelletizing machine producing pellets.

Barrel temperatures (zone 1 to zone 8, set points): 50-150-150-150-180-200-200-200° C. Die temperature: 200° C.

The resulting pellets were then injection molded to provide samples for mechanical and other tests. The pellets were also extruded through flat die into film (0.3 mm thickness, 30 cm width) on a single-screw extruder to check processability and film surface quality. The testing results of the obtained product are summarized in Table 1.

Examples 2-3

Different Ratios of Polymer Components

The procedure is according to Example 1, but with different amounts of the same ethylene-octene copolymer and random propylene-ethylene copolymer in the first mixture. The compositions and testing results of the obtained product are summarized in Table 1.

TABLE 1

Compositions and testing results for Examples 1-3

| Component | Example 1 | Example 2 | Example 3 |
|---|---|---|---|
| First mixture (parts by weight) | | | |
| EPDM | 50 | 40 | 70 |
| Random ethylene-propylene copolymer | 35 | 45 | 15 |
| VTMO | 1.2 | 1.00 | 1.00 |
| Luperox 101 | 0.1 | 0.08 | 0.08 |
| DBTDL | 0.03 | 0.03 | 0.03 |
| Second mixture (parts by weight) | | | |
| Random ethylene-propylene copolymer | 15 | 15 | 15 |
| Boric acid | 0.5 | 0.4 | 0.4 |
| Irganox B225 | 0.4 | 0.4 | 0.4 |
| Mineral oil | 35 | 20 | 70 |
| Properties | | | |
| Gel content in dispersed phase, % | 95 | 100 | 98 |
| Cross-link density, *$10^{-5}$ mol/cm$^3$ | 6.9 | 9.4 | 8.4 |
| Hardness Shore A | 82 | | 55 |
| Hardness Shore D | | 41 | |
| Tensile strength, Mpa | 8.6 | 14.6 | 3.8 |
| Elongation at break, % | 380 | >500 | 230 |
| Stress at 100%, Mpa | 6.2 | 8.2 | 2.1 |
| Tensile strength in weld line, Mpa | 6.5 | 12.3 | 2.6 |
| Elongation in weld line, % | 330 | 420 | 220 |
| Compression set (100° C., 22 h), % | 52 | 56 | 37 |

Examples 4-8

Different Types of Cross-Linked Disperse Phase Polymers

The procedure is according to Example 1, but with different types of dispersed phase polymers in the first mixture. The compositions and testing results are summarized in Table 2.

TABLE 2

Compositions and testing results for Examples 4-8

| Component | Examp. 4 | Examp. 5 | Examp. 6 | Examp. 7 | Examp. 8 |
|---|---|---|---|---|---|
| First mixture (parts by weight) | | | | | |
| Ethylene-octene copolymer | 60 | | | | |
| SBS (33% styrene) | | 50 | | | |
| LLDPE | | | 50 | | |
| MDPE | | | | 50 | |
| EVA (19% VA) | | | | | 50 |
| Random propylene-ethylene copolymer | 25 | 35 | 35 | 35 | 35 |
| VTMO | 1.00 | 1.2 | 1.2 | 1.2 | 1.2 |
| Luperox 101 | 0.08 | 0.1 | 0.1 | 0.1 | 0.1 |
| DBTDL | 0.03 | 0.03 | 0.03 | 0.03 | 0.03 |
| Second mixture (parts by weight) | | | | | |
| Random propylene-ethylene copolymer | 15 | 15 | 15 | 15 | 15 |
| Boric acid | 0.4 | 0.5 | 0.5 | 0.5 | 0.5 |
| Irganox B225 | 0.4 | 0.4 | 0.4 | 0.4 | 0.4 |
| Mineral oil | 42 | 35 | | | |
| Properties | | | | | |
| Gel content in dispersed phase, % | 99 | 98 | 100 | 100 | 100 |
| Cross-link density, *$10^{-5}$ mol/cm$^3$ | 8.7 | 30.0 | 94.3 (apparent) | 118.8 (apparent) | 77.9 (apparent) |
| Hardness Shore A | 87 | 86 | | | |
| Hardness Shore D | | | 54 | 58 | 51 |
| Tensile strength, Mpa | 8.2 | 13.0 | 17.6 | 20.4 | 15.2 |
| Elongation at break, % | 310 | 315 | 420 | 360 | 460 |
| Stress at 100%, Mpa | 4.7 | 8.1 | | | |
| Tensile strength in weld line, Mpa | 6.4 | 10.5 | 15.4 | 16.6 | 12.8 |
| Elongation in weld line, % | 280 | 240 | 370 | 280 | 350 |
| Compression set (100° C., 22 h), % | 43 | 50 | | | |

Examples 9-11

Different Matrix Polymers

The procedure is according to Example 4, but with different types of matrix polymers in the first and second mixtures. The compositions and testing results are summarized in Table 3.

TABLE 3

Compositions and testing results for Examples 9-11

| Component | Example 9 | Example 10 | Example 11 |
|---|---|---|---|
| First mixture (parts by weight) | | | |
| Ethylene-octene copolymer | 60 | 60 | 60 |
| Polypropylene homopolymer (MFR 2 dg/min) | 25 | | |
| Propylene-ethylene heterophasic copolymer (MFR 4 dg/min) | | 25 | |
| Nylon 6 | | | 25 |
| VTMO | 1.2 | 1.2 | 1.2 |
| Luperox 101 | 0.1 | 0.1 | 0.1 |
| DBTDL | 0.03 | 0.03 | 0.03 |
| Second mixture (parts by weight) | | | |
| Polypropylene homopolymer (MFR 2 dg/min) | 15 | | |
| Propylene-ethylene heterophasic copolymer (MFR 4 dg/min) | | 15 | |
| Nylon 6 | | | 15 |
| Boric acid | 0.5 | 0.5 | 0.5 |
| Irganox B225 | 0.4 | 0.4 | 0.4 |
| Mineral oil | 45 | 45 | |
| Properties | | | |
| Gel content in dispersed phase, % | 97 | 100 | 100 |
| Cross-link density, *$10^{-5}$ mol/cm$^3$ | 10.2 | 10.0 | 12.3 |
| Hardness Shore A | 76 | 72 | |
| Hardness Shore D | | | 46 |
| Tensile strength, Mpa | 8.4 | 6.8 | 17.2 |
| Elongation at break, % | 350 | 320 | 260 |
| Stress at 100%, Mpa | 5.3 | 4.7 | 10.3 |
| Tensile strength in weld line, Mpa | 6.8 | 5.2 | |
| Elongation in weld line, % | 290 | 26 | |
| Compression set (100° C., 22 h), % | 46 | 39 | 63 |

Examples 12-16

Different Amounts of Grafting and Cross-Linking Agents

The procedure is according to Example 1, but with different amounts of silane, peroxide, DBTDL in the first mixture and cross-linking agent in the second mixture. The compositions and testing results are summarized in Table 4.

TABLE 4

Compositions and testing results for Examples 12-16.

| Component | Examp. 12 | Examp. 13 | Examp. 14 | Examp. 15 | Examp. 16 |
|---|---|---|---|---|---|
| First mixture (parts by weight) | | | | | |
| Ethylene-octene copolymer | 60 | 60 | 60 | 60 | 60 |
| Random propylene-ethylene copolymer | 25 | 25 | 25 | 25 | 25 |
| VTMO | 0.6 | 2.5 | 1.2 | 1.2 | 1.2 |
| Perkadox 14 | 0.04 | | 0.1 | 0.1 | 0.1 |
| Dicumyl peroxide | | 0.2 | | | |
| DBTDL | 0.03 | 0.03 | | | |
| Second mixture (parts by weight) | | | | | |
| Random propylene-ethylene copolymer | 15 | 15 | 15 | 15 | 15 |
| Boric acid | 0.5 | 0.5 | 0.5 | 0.1 | 3.5 |
| Irganox B225 | 0.5 | 0.5 | 0.5 | 0.5 | 0.5 |
| Mineral oil | 45 | 45 | 45 | 45 | 45 |
| Properties | | | | | |
| Gel content in dispersed phase, % | 94 | 100 | 97 | 96 | 98 |

TABLE 4-continued

Compositions and testing results for Examples 12-16.

| Component | Examp. 12 | Examp. 13 | Examp. 14 | Examp. 15 | Examp. 16 |
|---|---|---|---|---|---|
| Cross-link density, *$10^{-5}$ mol/cm$^3$ | 5.1 | 17.2 | 8.7 | 9.2 | 13.4 |
| Hardness Shore A | 74 | 76 | 75 | 73 | 77 |
| Tensile strength, Mpa | 7.6 | 8.8 | 8.2 | 7.4 | 8.5 |
| Elongation at break, % | 380 | 305 | 350 | 360 | 315 |
| Stress at 100%, Mpa | 5.1 | 5.4 | 5.6 | 5.3 | 5.2 |
| Tensile strength in weld line, Mpa | 5.8 | 6.2 | 5.3 | 5.7 | 6.4 |
| Elongation in weld line, % | 210 | 280 | 260 | 225 | 280 |
| Compression set (100° C., 22 h), % | 56 | 48 | 51 | 54 | 42 |

Examples 17-21

Different Cross-Linking Agents

The procedure is according to Example 1, but with different cross-linking agents in the second blend. The composition and testing results are summarized in Table 5.

TABLE 5

Composition and testing results for Examples 17-21

| Component | Examp. 17 | Examp. 18 | Examp. 19 | Examp. 20 | Examp. 21 |
|---|---|---|---|---|---|
| First mixture (parts by weight) | | | | | |
| Ethylene-octene copolymer | 60 | 60 | 60 | 60 | 60 |
| Random propylene-ethylene copolymer | 25 | 25 | 25 | 25 | 25 |
| VTMO | 1.2 | 1.2 | 1.2 | 1.2 | 1.2 |
| Luperox 101 | 0.1 | 0.1 | 0.1 | 0.1 | 0.1 |
| DBTDL | 0.03 | 0.03 | 0.03 | 0.03 | 0.03 |
| Second mixture (parts by weight) | | | | | |
| Random propylene-ethylene copolymer | 15 | 15 | 15 | 15 | 15 |
| Oxalic acid | 0.5 | | | | |
| Citric acid | | 0.5 | | | |
| Pyromellitic acid | | | 0.5 | | |
| p-Toluene sulfonic acid | | | | 0.5 | |
| Adipic acid | | | | | 0.4 |
| Triethanol amine | | | | | 0.4 |
| Irganox B225 | 0.5 | 0.5 | 0.5 | 0.5 | 0.5 |
| Mineral oil | 45 | 45 | 45 | 45 | 45 |
| Properties | | | | | |
| Gel content in dispersed phase, % | 96 | 91 | 87 | 94 | 89 |
| Cross-link density, *$10^{-5}$ mol/cm$^3$ | 10.2 | 6.3 | 7.6 | 8.8 | 5.1 |
| Hardness Shore A | 76 | 74 | 72 | 77 | 71 |
| Tensile strength, Mpa | 7.6 | 6.8 | 6.3 | 8.4 | 6.1 |
| Elongation at break, % | 320 | 260 | 350 | 240 | 340 |
| Stress at 100%, Mpa | 5.3 | 5.6 | 5.1 | 5.4 | 4.9 |
| Tensile strength in weld line, Mpa | 6.0 | 5.2 | 5.0 | 5.8 | 4.6 |
| Elongation in weld line, % | 260 | 210 | 205 | 230 | 185 |
| Compression set (100° C., 22 h), % | 51 | 56 | 59 | 48 | 61 |

Example 22

Two-Step Process

The mixture of 50 parts by weight of ethylene-octene copolymer (Engage 8842 ex. DuPont Dow Elastomers), 50 parts by weight of random propylene-ethylene copolymer (MFI 0.3 at 230° C., 2.16 kg; 3.5% ethylene, ex. Carmel Olefins Ltd.), 1.2 parts by weight of vinyl trimethoxy silane (VTMO), 0.1 part by weight of 2,5-dimethyl-2,5-di-(tertbutylperoxy)hexane (Luperox 101 ex. Atofina Chemicals) and 0.08 parts by weight of dibutyltin dilaurate (DBTDL), prepared by dry mixing, was fed to the main feeding port of fully intermeshing co-rotating twin-screw extruder (Berstorff ZE25*32). Feeding rate—5.0 kg/h, screws speed—350 rpm. Mineral oil (Primol 262) was fed under pressure via injection port located at zone 7 of the extruder by means of a metering pump with the rate providing output of 102 g/min, i.e., 23 parts by weight of the oil per 100 parts of total polymers. The resulting molten and homogenized mixture was extruded via three-hole die producing strands that were cooled in the cooling bath, dried online by vacuum drier and cut on the palletizing machine producing pellets. Barrel temperatures (zone 1 to zone 8, set points): 50-130-140-150-180-200-200-200° C. Die temperature was 200° C.

101.38 parts by weight of the obtained pellets were mixed with 0.3 parts of boric acid, 0.50 parts of Irganox B225, 0.1 part of calcium stearate and 0.1 part of Primol 262 mineral oil and extruded on the same extruder at temperatures 50-180-190-190-190-190-190-190° C. and die temperature 190° C. with screws speed 300 rpm and throughout 10 kg/h to obtain the final pelletized product.

The testing results of the obtained product are summarized in Table 6.

TABLE 6

Compositions and testing results for Example 22

| Components | Results |
|---|---|
| First step | |
| PP-R | 50 |
| Engage 8842 | 50 |
| VTMO | 1.2 |
| Luperox 101 | 0.10 |
| DBTBL | 0.03 |
| Mineral oil | 23 |
| Second step | |
| Boric acid | 0.30 |
| Irganox B225 | 0.50 |
| Calcium stearate | 0.10 |
| 1 step product | 123 |
| Properties | |
| Gel content in dispersed phase % | 87 |
| Crosslink density, Mc | 14271 |
| Hardness Shore A | 90 |
| Hardness Shore D | 31 |
| Tensile strength, MPa | 7.4 |
| Elongation at break, % | 364 |
| Stress at 100% MPa | 4.9 |
| Compression set (100° C., 22 h), % | 53 |

Example 23

Batch Process

A mixture containing 27 g of ethylene-octene copolymer, 18 g of random propylene-ethylene copolymer (the same as in Example 1), 0.55 g VTMO, 0.05 g Luperox 101 and 0.03 g DBTDL were introduced into the batch mixture (Haake Rheomix 600) equipped with two roller blades at 180° C. and 20 rpm. Then the speed of the blades was increased to 100 rpm for the time period of 10 minutes. After this, 0.2 g of adipic acid and 0.2 g of Irganox B225 were added to the mixture and the blend was mixed for another 10 minutes at 150 rpm. After that the molten blend was discharged from the mixer and compression molded into the plate (thickness 2 mm). The samples for testing were cut from this plate. The testing results of obtained product are summarized in Table 7.

Examples 24-27

Variation of Batch Process

The procedure is according to Example 23 but with different combinations of polymers. The compositions and testing results are summarized in Table 7.

TABLE 7

Compositions and testing results for Examples 23-27

| Component | Examp. 23 | Examp. 24 | Examp. 25 | Examp. 26 | Examp. 27 |
|---|---|---|---|---|---|
| First period | | | | | |
| Ethylene-octene copolymer | 60 | 80 | | 60 | |
| Hydrogenated nitrile rubber | | | 60 | | 60 |
| Random propylene-ethylene copolymer | 40 | 20 | 40 | | |
| Nylon 6 | | | | 40 | 40 |
| Second period | | | | | |
| Adipic acid | 0.4 | | | | |
| Boric acid | | 1.0 | 1.0 | 1.0 | 1.0 |
| Irganox B225 | 0.4 | 0.4 | 0.4 | 0.4 | 0.4 |
| Properties | | | | | |
| Gel content in dispersed phase, % | 96 | 100 | 99 | 98 | 95 |
| Cross-link density, *$10^{-5}$ mol/cm$^3$ | 10.5 | 7.9 | | | |
| Hardness Shore A | 90 | 64 | 86 | | 84 |
| Hardness Shore D | | | | 44 | |
| Tensile strength, Mpa | 14.6 | 6.2 | 8.4 | 13.4 | 10.2 |
| Elongation at break, % | 720 | 240 | 320 | 165 | 158 |
| Compression set (100° C., 22 h), % | 54 | 32 | 58 | 67 | 56 |

Examples 28-32

Control

The procedure is according to Example 1, but with different compounds in the second mixture that are not acting as cross-linking agents. The compositions and testing results are summarized in Table 8.

TABLE 8

Compositions and testing results for Control Examples

| Component | Examp. 28 | Examp. 29 | Examp. 30 | Examp. 31 | Examp. 32 |
|---|---|---|---|---|---|
| First mixture (parts by weight) | | | | | |
| Ethylene-octene copolymer | 60 | 60 | 60 | 60 | 60 |
| Random ethylene-propylene copolymer | 25 | 25 | 25 | 25 | 25 |
| VTMO | 1.2 | 1.2 | 1.2 | 1.2 | 1.2 |
| Luperox 101 | 0.1 | 0.1 | 0.1 | 0.1 | 0.1 |
| DBTDL | 0.03 | 0.03 | 0.03 | 0.03 | 0.03 |
| Second mixture (parts by weight) | | | | | |
| Random ethylene-propylene copolymer | 15 | 15 | 15 | 15 | 15 |
| Stearic acid | | 1.0 | | | |
| Aluminum trihydrate | | | 1.0 | | |
| Calcium hydroxide | | | | 1.0 | |
| Ethylene bis-stearamide | | | | | 1.0 |
| Irganox B225 | 0.5 | 0.5 | 0.5 | 0.5 | 0.5 |
| Mineral oil | 45 | 45 | 45 | 45 | 45 |
| Properties | | | | | |
| Gel content in dispersed phase, % | 32 | 54 | 36 | 28 | 42 |
| Cross-link density, *$10^{-5}$ mol/cm$^3$ | 3.2 | 3.5 | 3.0 | 2.6 | 3.8 |
| Hardness Shore A | 69 | 68 | 71 | 66 | 70 |
| Tensile strength, Mpa | 5.2 | 5.6 | 6.0 | 5.1 | 6.4 |
| Elongation at break, % | 360 | 420 | 405 | 385 | 415 |
| Stress at 100%, Mpa | 3.1 | 2.9 | 3.3 | 3.4 | 3.5 |
| Tensile strength in weld line, Mpa | 2.7 | 3.1 | 2.8 | 3.0 | 3.4 |
| Elongation in weld line, % | 85 | 115 | 74 | 68 | 92 |
| Compression set (100° C., 22 h), % | 78 | 84 | 86 | 74 | 80 |

It can be seen from the Control Examples that lack of the right cross-linking agent does not allow obtaining thermoplastic vulcanizate with reasonable gel content, and cross-link density, and good mechanical and elastic properties.

In general, the vulcanizates of the invention have excellent properties, which include the following:

a) low rigidity;
b) high flexibility measured by low Shore hardness between 25 A and 60 D;
c) disperse phase content of at least 50% by volume;
d) high gel content of the vulcanized disperse phase component;
e) high cross-link density measured as knots concentration per cm$^3$ or molecular weight between of the vulcanized disperse phase component;
f) white color;
g) non-hygroscopicity;
h) lack of toxic components;
i) excellent processability by techniques used for processing thermoplastics, comprising extrusion, molding, thermoforming, blow molding, calendering;
k) very good impact resistance at room temperature and below 0° C.; and
l) high melt elasticity and melt strength.

Particular embodiments have been described only to illustrate the invention and it is to be understood that the invention can be carried out with many modifications, adaptations and variations, without departing from its spirit or exceeding the scope of the claims.

The invention claimed is:

1. Process for the production of thermoplastic vulcanizates, which comprises
   (a) preparing a mixture of polymeric materials, including a matrix and a disperse phase component, and
   (b) carrying out dynamic vulcanization of the disperse phase component, said dynamic vulcanization comprising the steps of:
   b.1) grafting an organic silane on said disperse phase component, whereby to produce grafted disperse phase component chains; and
   b.2) cross-linking said disperse phase component chains in the presence of a cross-linking agent comprising an acid; wherein the weight ratio of said cross-linking agent to said organic silane is from 1:3 to 1:1, and the duration of said cross linking is from a minute to half an hour; and wherein said grafting and said cross-linking are carried out in the molten state of said disperse phase component in the absence of water addition into said mixture of polymeric materials.

2. Process according to claim 1, wherein the organic silane is an alkoxy silane.

3. Process according to claim 1, wherein said cross-linking agent is selected from the group consisting of inorganic acid, organic sulfonic or carboxylic acid, anhydride of inorganic acid or anhydride of sulfonic or carboxylic organic acid, and polyfunctional compound having acid functionality in combination with an amine compound.

4. Process according to claim 3, wherein said cross-linking agent is selected from the group consisting of (I) boric acid and (ii) adipic acid with an amine.

5. Process according to claim 4, wherein the amine of the combinations of adipic acid and an amine is triisopropanol amine or triethanol amine.

6. Process according to claim 1, wherein the dynamic vulcanization is carried out in batch mode.

7. Process according to claim 1, wherein the dynamic vulcanization is carried out in continuous mode.

8. Process according to claim 1, wherein the matrix material is a semi-crystalline polymer.

9. Process according to claim 1, wherein the matrix material is an amorphous polymer.

10. Process according to claim 8, wherein the semi-crystalline polymer is chosen in the group consisting of thermoplastic polyesters, polyacetals, polyvynilidene fluoride (PVDF), polycarbonate, polystyrene and styrene copolymers, crystalline polyethylene, ethylene copolymers, polypropylene homopolymer, propylene-ethylene random copolymer, heterophasic propylene-ethylene copolymer, and polyamides.

11. Process according to claim 1, wherein the matrix polymer is in the amount of 15 to 80 wt % of the total polymeric composition.

12. Process according to claim 1, wherein the disperse phase component is chosen in the group consisting of polyethylene having density in the range 0.90-0.96 g/cm$^3$, ethylene-alpha-olefin copolymers having density in the range 0.85-0.95 g/cm$^3$, ethylene copolymers with vinyl acetate or acrylate or other polar monomers, chlorinated polyethylene, styrene block copolymers, natural rubber, polybutadiene, nitrile rubber, butadiene-styrene rubber, nitrile rubber, chloroprene rubbers, butyl rubber, hydrogenated rubbers, and blends thereof.

13. Process according to claim 1, wherein the disperse phase component is in the amount of 20 to 85 wt % of the total polymeric composition.

14. Process according to claim 1, wherein the cross-linking agent is in the amount of 0.05 to 5 parts per 100 parts of the total polymeric composition.

15. Process according to claim 1, further comprising adding to the thermoplastic vulcanizate, at any convenient stage of the preparation thereof, one or more additional components chosen from the group consisting of antioxidants, plasticizers, mineral fillers and functional components, and additional polymer components selected from crystalline or amorphous polymers, elastomers, and grafted polymers.

16. Process according to claim 1, wherein the matrix is not cross-linkable.

17. Process according to claim 1, wherein the disperse phase component has a melting point lower than the melting point of the matrix and the grafting is carried out at temperatures between the melting point of the matrix and the melting point of the disperse phase component.

18. Process according to claim 1, wherein the grafting is carried out at temperatures at which all the polymeric components are molten.

19. Process according to claim 1, further comprising removing any residues of the volatile components by venting or vacuum after the grafting stage has ended.

20. Process according to claim 6, wherein the grafting and the cross-linking are carried out successively.

21. Process according to claim 6, wherein the grafting and the cross-linking are carried out in different zones of the barrel of an extruder.

22. Process according to claim 6, comprising the steps of:
   a) mixing the disperse phase component and at least part of the matrix with the chosen silane, free radicals, free radical generators and optionally tin-organic compounds;
   b) bringing the mixture of the aforesaid components to the grafting temperature;
   c) allowing the grafting to take place;
   d) after the grafting, raising the temperature of the mixture to at least the melting point of the matrix, and adding the cross-linking agent and antioxidant;
   e) allowing the cross-linking to occur, whereby phase inversion occurs;
   f) optionally, devolatilizing the resulting product;
   g) adding any required additional components, while mixing; and
   h) discharging the final product.

23. Process according to claim 7, comprising the steps of:
   a) feeding at least part of the matrix and all other polymeric components to the feed hopper of an extruder;
   b) feeding silane and peroxide to a feeding zone of the extruder, while cooling said zone;
   c) heating the grafting zone of the extruder to such a temperature as to melt the disperse phase component without melting the matrix;
   d) kneading the resulting mixture;
   e) feeding an additional feeder zone of the extruder the additives needed for causing cross-linking, including cross-linking agents and antioxidants;
   f) if necessary, completing the feeding of the matrix;
   g) mixing and kneading the mixture of the fed components, while heating;
   h) removing the volatiles;
   i) optionally adding extender oil and mixing; and
   k) extruding the resulting product.

24. Process according to claim 1, wherein said disperse phase component comprises more than 95% gel content.

* * * * *